(12) United States Patent
Ziaylek et al.

(10) Patent No.: US 7,137,479 B2
(45) Date of Patent: Nov. 21, 2006

(54) POWERED LADDER STORAGE APPARATUS FOR AN EMERGENCY VEHICLE

(75) Inventors: Michael P. Ziaylek, 15 Cold Spring Ave., Yardley, PA (US) 19067; Cielito B. Agoncillo, Newtown, PA (US)

(73) Assignees: Michael P. Ziaylek, Yardley, PA (US); Theodore Ziaylek, Jr., Yardley, PA (US); Theodore P. Ziaylek, Yardley, PA (US)

( * ) Notice: Subject to any disclaimer, the term of this patent is extended or adjusted under 35 U.S.C. 154(b) by 258 days.

(21) Appl. No.: 10/961,881

(22) Filed: Oct. 8, 2004

(65) Prior Publication Data

US 2006/0076189 A1    Apr. 13, 2006

(51) Int. Cl.
*B60P 3/00* (2006.01)

(52) U.S. Cl. ............... 182/127; 414/462; 224/310
(58) Field of Classification Search ........... 182/127; 414/462; 224/310
See application file for complete search history.

(56) References Cited

U.S. PATENT DOCUMENTS

| | | |
|---|---|---|
| 1,890,940 A | 12/1932 | Fox |
| 1,898,826 A | 2/1933 | Fox |
| 1,899,742 A * | 2/1933 | Bay .................. 182/18 |
| 2,005,990 A | 6/1935 | Darley |
| 2,116,470 A * | 5/1938 | Kiley et al. ............. 182/98 |
| 2,586,531 A | 2/1952 | Gordon |
| 2,946,397 A | 7/1960 | Berberich |
| 3,013,681 A | 12/1961 | Garnett |
| 3,058,607 A | 10/1962 | Kiley |
| 3,563,342 A | 2/1971 | Lasiter |
| 3,621,935 A * | 11/1971 | Bode ................. 182/68.1 |
| 3,672,549 A | 6/1972 | Chorey |
| 4,058,243 A | 11/1977 | Tappan |
| 4,059,281 A | 11/1977 | Evans |
| 4,062,464 A | 12/1977 | Grove |
| 4,139,078 A | 2/1979 | Keller |
| 4,161,997 A | 7/1979 | Norman |
| 4,170,331 A | 10/1979 | Faulstich |
| 4,234,285 A * | 11/1980 | Martinez ............... 414/462 |
| 4,239,438 A | 12/1980 | Everson |
| 4,344,508 A | 8/1982 | Peck |
| 4,408,680 A | 10/1983 | Ross |
| 4,618,083 A | 10/1986 | Weger, Jr. |
| 4,738,582 A | 4/1988 | Roberts |
| 4,751,981 A | 6/1988 | Mitchell et al. |
| 4,827,742 A | 5/1989 | McDonald |
| 4,858,725 A | 8/1989 | Griffin |
| 4,877,108 A | 10/1989 | Griffin et al. |
| 4,909,352 A | 3/1990 | McComb |
| 4,953,757 A | 9/1990 | Stevens et al. |
| 5,009,350 A | 4/1991 | Schill et al. |
| 5,048,641 A | 9/1991 | Holcomb et al. |

(Continued)

*Primary Examiner*—Alvin Chin-Shue
(74) *Attorney, Agent, or Firm*—Sperry, Zoda & Kane

(57) ABSTRACT

An automatically movable storage apparatus for retaining a ladder on top of an emergency vehicle and facilitating movement thereof to a deployed position extending downwardly and rearwardly therefrom selectively to make the ladder available for usage. After usage the ladder will be replaced and the automatic storage apparatus will power the movement of the ladder retained within the ladder retaining frame up to the storage position on top of the emergency vehicle for transport. A pivotally movable carriage is secured to the ladder retaining frame with various drive means thereon to facilitate movement of the frame to the rearwardly extended position and the inclined position and to facilitate locking thereof in the storage position.

29 Claims, 10 Drawing Sheets

U.S. PATENT DOCUMENTS

| | | |
|---|---|---|
| 5,064,022 A | 11/1991 | Graham |
| 5,071,308 A | 12/1991 | Tibbet |
| 5,104,280 A | 4/1992 | Ziaylek et al. |
| D331,030 S | 11/1992 | Ziaylek et al. |
| 5,172,952 A | 12/1992 | Lasnetski |
| 5,297,912 A | 3/1994 | Levi |
| 5,421,495 A | 6/1995 | Bubik et al. |
| 5,447,408 A * | 9/1995 | Smith .................. 414/538 |
| 5,469,933 A | 11/1995 | Thomason |
| 5,518,357 A | 5/1996 | Ziaylek, Jr. |
| 5,538,100 A | 7/1996 | Hedley |
| 5,632,591 A | 5/1997 | Henriquez |
| 5,743,702 A | 4/1998 | Gunderson |
| 5,791,857 A | 8/1998 | Ziaylek, Jr. et al. |
| 5,850,891 A | 12/1998 | Olms et al. |
| 6,003,633 A | 12/1999 | Rolson |
| 6,012,545 A | 1/2000 | Faleide |
| 6,029,750 A | 2/2000 | Carrier |
| 6,092,972 A | 7/2000 | Levi |
| 6,257,534 B1 | 7/2001 | Finley |
| 6,315,181 B1 | 11/2001 | Bradley et al. |
| 6,427,889 B1 | 8/2002 | Levi |
| 2004/0052622 A1* | 3/2004 | Chisnall ................. 414/462 |

* cited by examiner

POWERED LADDER STORAGE APPARATUS FOR AN EMERGENCY VEHICLE

BACKGROUND OF THE INVENTION

1. Field of the Invention

The present invention deals with the field of devices usable for storage of equipment on emergency vehicles such as fire trucks. Firefighting requires a great deal of different types of equipment in the modern world and as a result there is a great premium on space when attaching the many different types of emergency equipment with respect to an emergency vehicle in a manner such that it is easily accessible and readily usable by firefighters and other emergency personnel. The apparatus of the present invention provides a means for automatically moving a ladder positioned within a ladder retaining frame from a ladder storage position on top of an emergency vehicle to a rearwardly extended position extending rearwardly therefrom and finally to a rearwardly and downwardly inclined position wherein the ladder is deployed ready for usage and movement back to the storage position. These movements are all powered by various different driving means and are operable to maintain the ladder and the ladder storage parts at all times within a very restricted space envelope or window in such a manner that a minimal amount of space is used.

Significant space saving is achieved because the ladder is stored on top of the emergency vehicle. The top of the emergency vehicle is a very difficult place to store materials in view of the fact that they have only limited accessibility when stored thereon. However, the present invention provides a means for powering movement of the relatively large ladders used in firefighting and other emergency services between the fully stored position out of reach of the firefighting or emergency personnel and the fully deployed position extending rearwardly therefrom such that the ladder is made readily available. Thus the present invention provides a means for making use of the upper or top area of an emergency vehicle which is otherwise difficult to make use of in such emergency vehicles for the storage of equipment used in emergency situations such as ladders.

2. Description of the Prior Art

Numerous patents have been granted for the purposes of storing ladders with respect to vehicles or at remote limited access locations such as shown in U.S. Pat. No. 1,890,940 issued Dec. 13, 1932 to C. H. Fox on a "Fire Engine"; and U.S. Pat. No. 1,898,826 issued Feb. 21, 1933 to C. H. Fox on a "Fire Engine"; and U.S. Pat. No. 2,005,990 issued to W. S. Darley on Jun. 25, 1935 on a "Fire Truck"; and U.S. Pat. No. 2,586,531 issued Feb. 19, 1952 to D. L. Gordon on a "Wheeled Support Having Ladder Assembly"; and U.S. Pat. No. 2,946,397 issued Jul. 26, 1960 to W. A. Berberich on a "Ladder Mount For Vehicles"; and U.S. Pat. No. 3,013,681 issued Dec. 19, 1961 to E. V. Garnett on a "Device For Storage Of Elongated Articles On A Vehicle"; and U.S. Pat. No. 3,058,607 issued Oct. 16, 1962 to J. T. Kiley on "Ladder Racks"; and U.S. Pat. No. 3,563,342 issued Feb. 16, 1971 to E. Lasiter on a "Truck Ladder"; and U.S. Pat. No. 3,672,549 issued Jun. 27, 1972 to A. J. Chorey on a "Car Top Carrier And Access Ladder"; and U.S. Pat. No. 4,058,243 issued Nov. 15, 1977 to L. E. Tappan on a "Car Top Load Carrier"; and U.S. Pat. No. 4,059,281 issued Nov. 22, 1977 to D. W. Evans and assigned to Towmotor Corporation on a "Mounting Assembly For A Controllably Movable Fluid Tank"; and U.S. Pat. No. 4,062,464 issued Dec. 13, 1977 to R. E. Grove on "Mounting Brackets For An Article Handling Apparatus"; and U.S. Pat. No. 4,139,078 issued Feb. 13, 1979 to J. R. Keller on a "Ladder Assembly"; and U.S. Pat. No. 4,161,997 issued Jul. 24, 1979 to T. W. Norman on a "Self-Storing Step Structure For Vehicular Mounting"; and U.S. Pat. No. 4,170,331 issued Oct. 9, 1979 to E. W. Faulstich on a "Vehicle Ladder Rack"; and U.S. Pat. No. 4,239,438 issued Dec. 16, 1980 to C. R. Everson on a "Device For Lifting And Carrying Loads On Top Of Pickup Trucks"; and U.S. Pat. No. 4,344,508 issued Aug. 17, 1982 to A. W. Peck and assigned to Alcan Research and Development Limited on a "Lift Mechanism For A Vehicle Tail-Board Or Other Load Platform"; and U.S. Pat. No. 4,408,680 issued Oct. 11, 1983 to D. O. Ross on a "Ladder Support Assembly"; and U.S. Pat. No. 4,618,083 issued Oct. 21, 1986 to K. F. Weger, Jr. and assigned to Knaack Mfg. Co. on a "Ladder Clamping Device For Vehicle Rack"; and U.S. Pat. No. 4,738,582 issued Apr. 19, 1988 to J. E. Roberts and assigned to E Manufacturing Company Inc. on a "Tank Carrier And Manipulator"; and U.S. Pat. No. 4,751,981 issued Jun. 21, 1988 to J. C. Mitchell et al on a "Detachably Mounted Ladder Rack"; and U.S. Pat. No. 4,827,742 issued May 9, 1989 to R. R. McDonald and assigned to Unistrut Australia Pty. Ltd. on a "Security Assembly For Vehicle Roofrack"; and U.S. Pat. No. 4,858,725 issued Aug. 22, 1989 to L. H. Griffin on a "Ladder Brace"; and U.S. Pat. No. 4,877,108 issued Oct. 31, 1989 to L. H. Griffin et al on a "Hydraulic Ladder Brace"; and U.S. Pat. No. 4,909,352 issued Mar. 20, 1990 to K. McComb on a "Ladder Support System"; and U.S. Pat. No. 4,953,757 issued Sep. 4, 1990 to J. R. Stevens et al on a "Front Rack For A Truck"; and U.S. Pat. No. 5,009,350 issued Apr. 23, 1991 to J. M. Schill et al on "Retainer Assemblies For Elongated Objects"; and U.S. Pat. No. 5,048,641 issued Sep. 17, 1991 to J. N. Holcomb et al and assigned to Jack N. Holcomb on a "Van-Mounted Ladder Assembly With Concealed Radio Antennas"; and U.S. Pat. No. 5,064,022 issued Nov. 12, 1991 to G. W. Graham and assigned to Marrowbone Development Company on a "Ladder Apparatus And Method For Large Mobile Eguipment"; and U.S. Pat. No. 5,071,308 issued Dec. 10, 1991 to J. Tibbet on an "Apparatus For Loading And Carrying Boats"; and U.S. Pat. No. 5,104,280 issued to M. P. Ziaylek et al on Apr. 14, 1992 and assigned to Michael P. Ziaylek on an "Apparatus For Use With An Emergency Vehicle For Storage And Retrieval Of Remotely Located Emergency Devices"; and U.S. Design Pat. No. Des.331,030 issued Nov. 17, 1992 to M. P. Ziaylek et al on a "Unit For Use With An Emergency Vehicle For Storage And Retrieval Of Remotely Located Emergency Devices"; and U.S. Pat. No. 5,172,952 issued Dec. 22, 1992 to R. Lasnetski on an "Overhead Storage Rack For Storing Ladders Or The Like"; and U.S. Pat. No. 5,421,495 issued Jun. 6, 1995 to L. Bubik et al and assigned to Innovative Bicycle Design Inc. on a "Vehicle Roof Rack"; and U.S. Pat. No. 5,297,912 issued to A. Y. Levi on Mar. 29, 1994 and assigned to JAJ Products, Inc. on a "Ladder Rack For Motor Vehicles" and U.S. Pat. No. 5,469,933 issued Nov. 28, 1995 to J. Thomason on a "Vehicle Mounted Ladder"; and U.S. Pat. No. 5,518,357 issued May 21, 1996 to T. Ziaylek, Jr. et al and assigned to Theodore Ziaylek, Jr. and Michael P. Ziaylek on a "Retaining And Retrieval Apparatus For Storage Of A Ladder Upon A Vehicle Shelf Area"; and U.S. Pat. No. 5,538,100 issued Jul. 23, 1996 to R. I. Hedley on an "Access Device"; and U.S. Pat. No. 5,632,591 issued May 27, 1997 to K, R. Henriquez on a "Ladder Storage And Transport Device"; and U.S. Pat. No. 5,743,702 issued Apr. 28, 1998 to M. J. Gunderson on a "Method And Apparatus For A Vehicle Mounted Hoisting System"; and U.S. Pat. No. 5,791,857 issued Aug. 11, 1998 to T. Ziaylek, Jr. et al and assigned to Theodore Ziaylek, Jr. and Michael Paul Ziaylek on an "Automatic Ladder Lowering And Storage Device For Use With An Emergency Vehicle"; and U.S. Pat. No. 5,850,891 issued Dec. 22 1998 to J. J. Olms et al and assigned to Trimble Navigation Limited on a "Motorized Rack System" and U.S. Pat. No. 6,003,633 issued Dec. 21, 1999 to R. G. Rolson and assigned to Robert G. Rolson on a "Portable Truck Or Trailer Ladder Assembly"; and U.S. Pat. No. 6,012,545 issued Jan. 11, 2000 to E. Faleide on a "Foldable Vehicle Ladder System"; and U.S. Pat. No. 6,029,750 issued Feb. 29, 2000 to B. E. Carrier on an "All Terrain Fire-Fighting Vehicle"; and U.S. Pat. No. 6,092,972 issued Jul. 25, 2000 to A. Y. Levi on a "Truck Mounted Ladder Rack"; and U.S. Pat. No. 6,315,181 issued Nov. 13, 2001 to J. A. Bradley et al and assigned to Adrian Steel Company on a "Ladder Rack Apparatus And Method"; and U.S. Pat. No. 6,427,889 issued Aug. 6, 2002 to A. Y. Levi on a "Ladder Rack For Hi Bay Vans".

SUMMARY OF THE INVENTION

The present invention provides a powered ladder storage apparatus designed particularly for movement of a ladder between a storage position located on top of an emergency or other similar vehicle and a deployed position extending downward and rearwardly therefrom to facilitate access to the stored ladder. The apparatus includes a ladder retaining frame adapted to receive and selectively retain the ladder. This ladder retaining frame is preferably movably attached with respect to the emergency vehicle and includes a front frame end and a rear frame end with an open channel extending longitudinally therealong. The ladder retaining frame means is adapted to receive and retain a ladder selectively with respect thereto for facilitating access. The open channel extending longitudinally along the ladder retaining frame can include truncated channel corners mated to similar truncated corners on rollers for facilitating controlled guidance therebetween. A drive chain is preferably fixedly mounted to the ladder retaining frame means and extends longitudinally therealong to facilitate driving of movement of the ladder retaining frame means.

A carriage device is preferably included pivotally secured with respect to the top of the emergency vehicle. The ladder retaining frame is preferably movably attached with respect to the carriage at a location between the front frame end and the rear frame end. The carriage and the ladder retaining frame area also pivotally movable together relative to the emergency vehicle for movement of the ladder to the deployed position. The carriage further includes a plurality of carriage rollers rotatably mounted thereon. These carriage rollers are adapted to be positioned within the open channel of the ladder retaining frame to allow supported movement thereof relative to the carriage between the storage position and the rearwardly extended position. These carriage rollers preferably define truncated roller corners mated to the truncated channel corners for facilitating mated engaging guidance therebetween.

A power drive is also preferably included which is operatively attached with respect to the ladder retaining frame in order to urge sliding movement thereof in an approximately horizontal direction between the storage position which is located immediately adjacent to the top of the emergency vehicle and the rearwardly extended position extending rearwardly therefrom also in an approximately horizontal orientation. A power control linkage will be operatively secured to the power drive and operatively secured to the ladder retaining frame to control movement thereof between the storage position and the rearwardly extended position responsive to operation of the power drive.

This power control linkage preferably includes a drive sprocket rotatably mounted with respect to the carriage and positioned in engagement with respect to the ladder retaining frame to facilitate driving thereof between the storage position and the rearwardly extending position. The drive sprocket preferably is positioned in engagement with the drive chain secured to the ladder retaining frame in order to facilitate driving of movement of this ladder retaining frame between the storage position and the rearwardly extended position, respectively. A clutch mechanism may also be included in the power linkage operative to halt movement of the ladder retaining frame means between the storage position and the rearwardly extended position thereof whenever any type of malfunction exists such as when the frame contacts and environmental structure or any other structure that might inhibit free and clear movement thereof. In this manner the clutch will provide some safety for personnel and for preventing damage to the equipment.

Also included in the present invention is a longitudinally extendable member such as an electric actuator which is operatively attached with respect to the carriage to cause pivotal movement thereof and of the ladder retaining frame and for moving the ladder retaining frame between the rearwardly extended position and the rearwardly inclined position. This rearwardly inclined position is the location where the ladder is deployed to be readily available for usage. In this position the frame front end will be located in mid air above the top of the emergency vehicle and the frame rear end will be positioned in mid air behind or to the rear of the emergency vehicle.

The rear frame end of the ladder retaining frame is preferably spatially disposed above the surrounding environmental ground surface at a distance of approximately 36–48 inches. The longitudinally extensible cylinder member is preferably operative to cause movement of the ladder retaining frame toward the rearwardly inclined position responsive to longitudinal extension thereof. The longitudinally extensible cylinder is also operative to cause movement of the ladder retaining frame from the rearwardly inclined position toward the storage position responsive to longitudinal contraction thereof.

At least one roller supporting mechanism is included secured to the top of the emergency vehicle and extending upwardly therefrom at a position forwardly from the location of the carriage in order to facilitate supporting of the ladder frame above the emergency vehicle when moving toward or away from the storage position as well as while positioned therein. This roller supporting mechanism preferably includes a plurality of support rollers spatially disposed with respect to one another for facilitating supporting of the ladder retaining frame thereabove on the emergency vehicle. This spacing is important to provide equalized support beneath the ladder retaining frame. The support rollers are designed to abut the ladder retaining frame at a position immediately beneath the channel means defined therein in order to facilitate supporting of the ladder retaining frame above the top of the emergency vehicle when moving toward and away from the storage position and while in the storage position.

A front locking mechanism is included which is adapted to engage the ladder retaining frame adjacent to the forward frame end thereof responsive to movement of it into the storage position to facilitate retaining of the forward frame and thereof firmly engaged with respect to the top of the emergency vehicle especially during traveling thereof. The front locking device includes a locking wheel adapted to engage the ladder retaining frame adjacent the frame front end thereof to further facilitate retaining of the forward frame end firmly with respect to the top of the emergency vehicle when the ladder retaining frame means is stored. The locking wheel preferably is adapted to be positionable within the open channel to facilitate detachable securement of the ladder retaining frame with respect to the emergency vehicle responsive to positioning of the ladder retaining frame in the storage position.

A rear locking mechanism is also preferably included which is adapted to engage the ladder retaining frame adjacent the rear frame end thereof in order for detachable securement thereof with respect to the emergency vehicle responsive to positioning of the ladder retaining frame in the storage position.

In this preferred configuration the rear locking mechanism includes a powered cylinder pivotally secured with respect to the carriage and outwardly extensible therefrom. A mechanical latch is also preferably included movably secured with respect to the carriage. Finally a rear locking linkage is included which is operatively attached with respect to the powered cylinder member and operatively attached with respect to the mechanical latch. This rear locking linkage is operative to urge the mechanical latch selectively into locking engagement with respect to the rear frame end of the ladder retaining frame responsive to extending of the cylinder member in order to hold the ladder retaining frame means in the storage position.

Preferably the present invention includes at least one equipment holding sleeve or corridor secured to the ladder retaining frame and extending longitudinally therealong for receiving and holding auxiliary firefighting equipment therewithin such as firefighting pole tools and collapsible ladders.

A first rear limit switch is also included which is adapted to be actuated responsive to movement of the ladder retaining frame into the storage position to terminate flashing of the emergency lights as well as causing cessation of operation of the power drive. A pivotally movable latching mechanism is provided capable of engaging the ladder frame for retaining thereof in the storage position. A powered air cylinder member is preferably included which is operatively connected with respect to the latching mechanism for disengaging same from the ladder frame. The powered air cylinder is also simultaneously operative to actuate a second rear limit switch which renders the power drive operative to initiate movement of the ladder frame toward the rearwardly extended position.

In the present invention it is preferable that the locking wheels are adapted to extend into the open channel for movably supporting engagement therewith responsive to positioning of the ladder retaining frame into the storage position to facilitate engagement of the front frame end thereof with respect to the emergency vehicle therebelow. Also more preferably the ladder retaining frame will define an upper support surface positioned within the open channel and facing downwardly therewithin in order to be positioned in supporting abutment with respect to the locking wheel to facilitate locking of the front frame end of the ladder retaining frame in the storage position.

Also the ladder retaining frame of the present invention preferably will define a lower support surface positioned beneath the open channel and facing downwardly therefrom to be positioned in supporting abutment with respect to the roller supporting mechanism to facilitate supporting of the ladder retaining frame thereabove.

The present invention preferably further includes a flexible resilient electrical line fixedly secured to the carriage and the ladder retaining frame means and movable with each of these parts as they move relative to one another due to the flexible nature of the electrical line. Also an electrical conduit is preferably fixedly secured to the ladder retaining frame which extends longitudinally therealong. The flexibly resilient electrical line will be positionable within the electrical conduit to facilitate movement thereof along with the ladder retaining frame while maintaining securement of the flexibly resilient electrical line with respect to the carriage.

The present invention further preferably includes a plurality of angled bracket members positioned in the ladder retaining frame and fixedly secured thereto to receive a ladder in abutment therewith when attached to the ladder retaining frame to facilitate retaining thereof. Preferably each of these angled retaining brackets will include a thermoplastic wear block to further facilitate holding of the ladder by the ladder retaining frame.

It is an object of the powered ladder storage apparatus of the present invention to provide movement of a ladder between a storage position on top of an emergency vehicle and a deployed position extending downwardly and rearwardly therefrom wherein the ladder is accessible.

It is an object of the powered ladder storage apparatus of the present invention for providing movement of a ladder between a storage position and a rearwardly extended position and subsequently to a deployed position extending rearwardly and downwardly from the back of the emergency vehicle to make the ladder available for usage by emergency personnel.

It is an object of the powered ladder storage apparatus of the present invention wherein a carriage is provided pivotally movable with respect to the top of an emergency vehicle.

It is an object of the powered ladder storage apparatus of the present invention wherein a ladder can be easily stored and retrieved between remote locations and accessible locations on an emergency vehicle.

It is an object of the powered ladder storage apparatus of the present invention wherein storage of auxiliary equipment such as firefighting poles and collapsible ladders is made possible.

It is an object of the powered ladder storage apparatus of the present invention wherein a full locking system is provided for retaining the front end of the ladder retaining frame with respect to the emergency vehicle.

It is an object of the powered ladder storage apparatus of the present invention wherein a full locking system is provided for retaining the rear end of the ladder retaining frame with respect to the emergency vehicle.

It is an object of the powered ladder storage apparatus of the present invention for providing fully automated movement of the ladder between a storage position on top of an emergency vehicle and a deployed position extending downwardly and rearwardly therefrom.

It is an object of the powered ladder storage apparatus of the present invention to provide movement of a ladder between a storage position on top of an emergency vehicle and a deployed position extending downwardly and rearwardly therefrom wherein maintenance requirements are minimized.

It is an object of the powered ladder storage apparatus of the present invention to provide movement of a ladder between a storage position on top of an emergency vehicle and a deployed position extending downwardly and rearwardly therefrom wherein the number of moving parts is minimal.

It is an object of the powered ladder storage apparatus of the present invention to provide movement of a ladder between a storage position on top of an emergency vehicle and a deployed position extending downwardly and rearwardly therefrom wherein reliability is significantly enhanced.

It is an object of the powered ladder storage apparatus of the present invention to provide movement of a ladder between a storage position on top of an emergency vehicle and a deployed position extending downwardly and rearwardly therefrom wherein manual powering is not required for any purpose.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
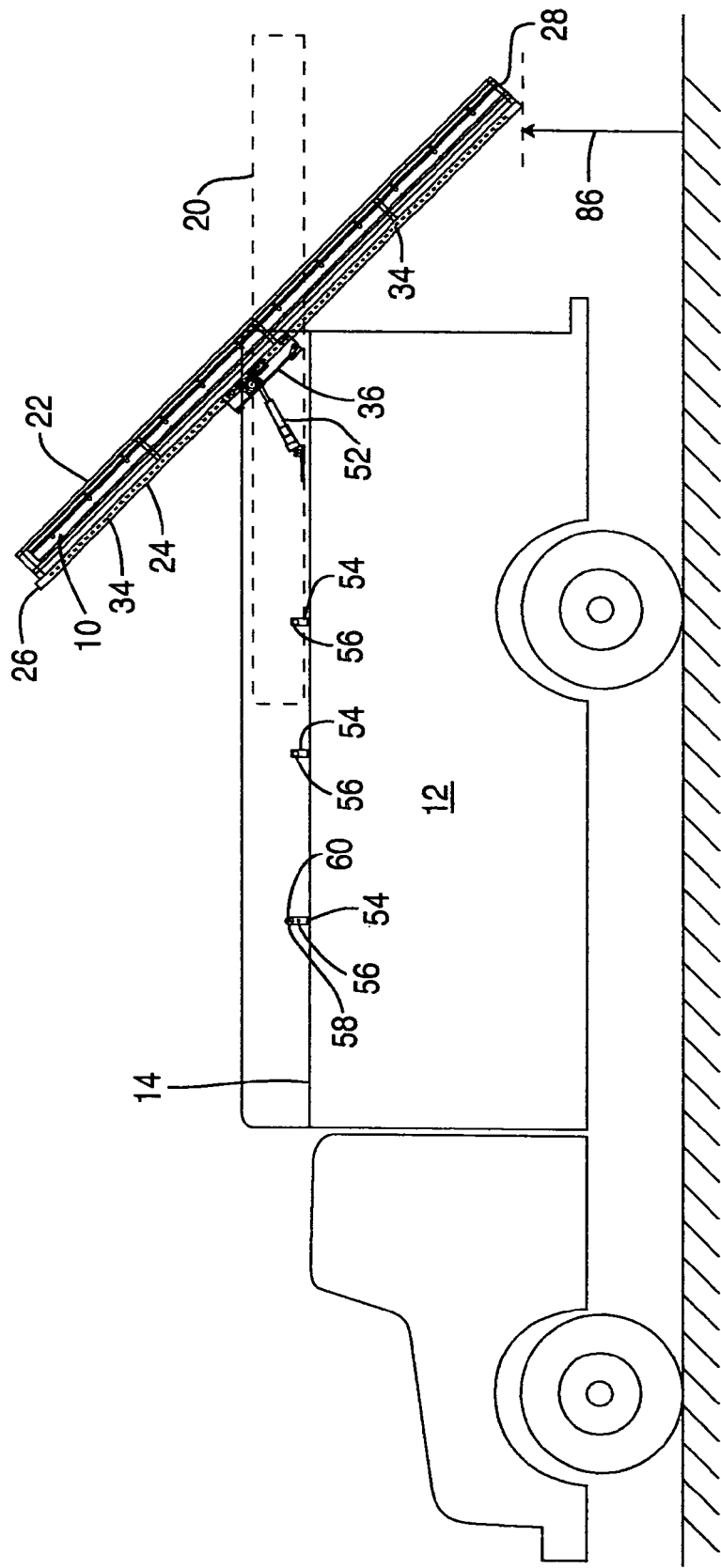
FIG. 1 is a side plan view of an embodiment of the powered ladder storage apparatus of the present invention shown in the deployed position in full line and in the rearwardly extended position in dotted outline.

A unique apparatus is provided in accordance with the present invention for the purpose of storing of a ladder 10 on the top 14 of an emergency vehicle 12. Normally such emergency vehicles 12 are significantly tall and the top area 14 thereof is inaccessible or of limited accessibility. The present invention provides a unique means for storing of a ladder 10 on top of the emergency vehicle 12 which is automatically movable between a storage position 18 and a deployed position 22. The deployed position 22 is located in a rearwardly inclined position to the rear 16 of the emergency vehicle 12. Furthermore an intermediate position is defined as a rearwardly extended position 20 as shown best in phantom outline on FIG. 1. As such, the apparatus of the present invention is designed to move a ladder retaining frame 24 which holds the ladder 10 with respect thereto initially in the storage position 18 with movement to the rearwardly extended position 20 followed by movement to the rearwardly inclined position 22. At this position access to the ladder is provided to emergency personnel such as firefighters and the like. Once current usage of the ladder 10 is terminated the powered ladder storage apparatus can move from the rearwardly inclined or deployed position 22 upwardly to the rearwardly extended position 20 and finally to the storage position 18 at which point it is locked and, thusly, movement of the emergency vehicle 12 in the standard manner is possible such as returning to a fire hall after fighting of a fire.

The construction of the ladder retaining frame 24 includes a front frame end 26 and a rear frame end 28. Front frame end 26 is designed to be positioned in the forwardmost location on the emergency vehicle 12 closest to the cab thereof. The rear frame end 28 is designed to be positioned closest to the rear 16 of the emergency vehicle 12. An open channel 30 preferably is defined extending longitudinally along the ladder retaining frame 12.

Figure 2:
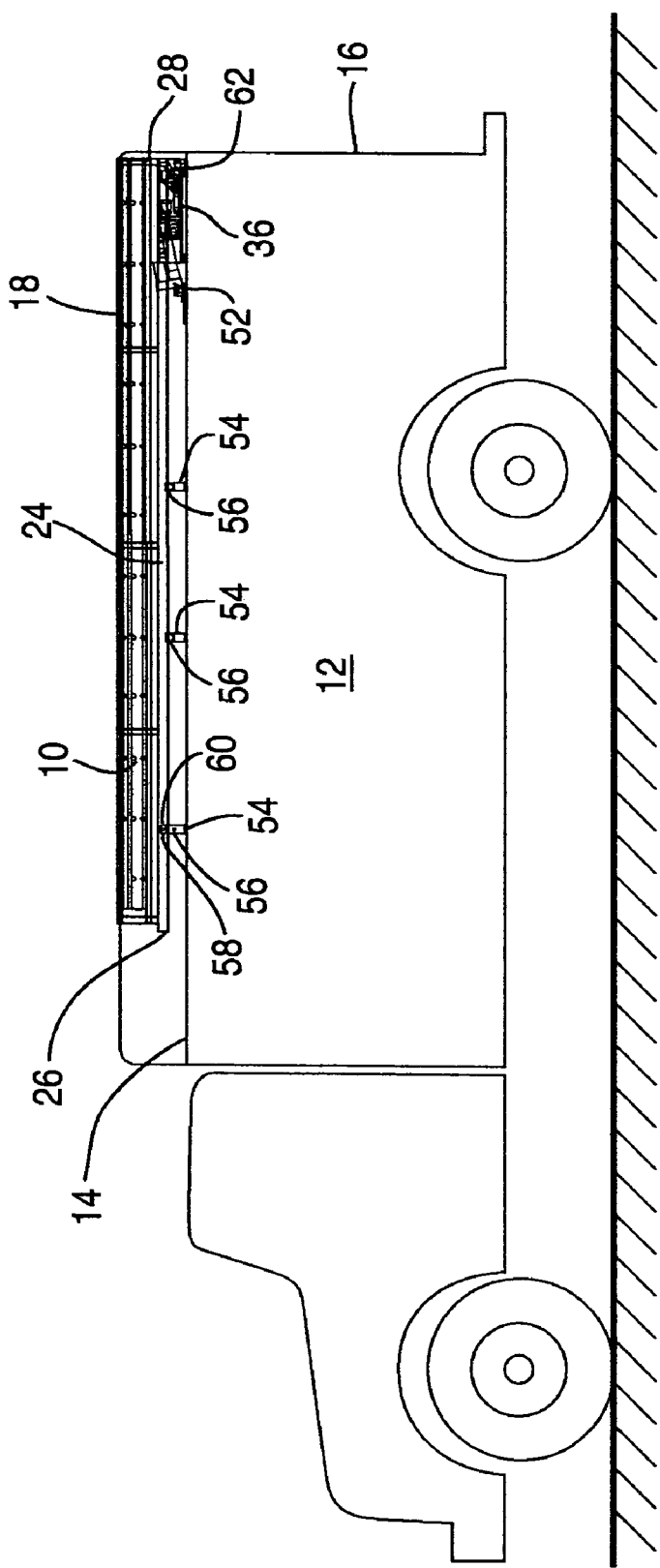
FIG. 2 is a side plan view of an embodiment of the powered ladder storage apparatus of the present invention shown in the storage position.
Figure 3:
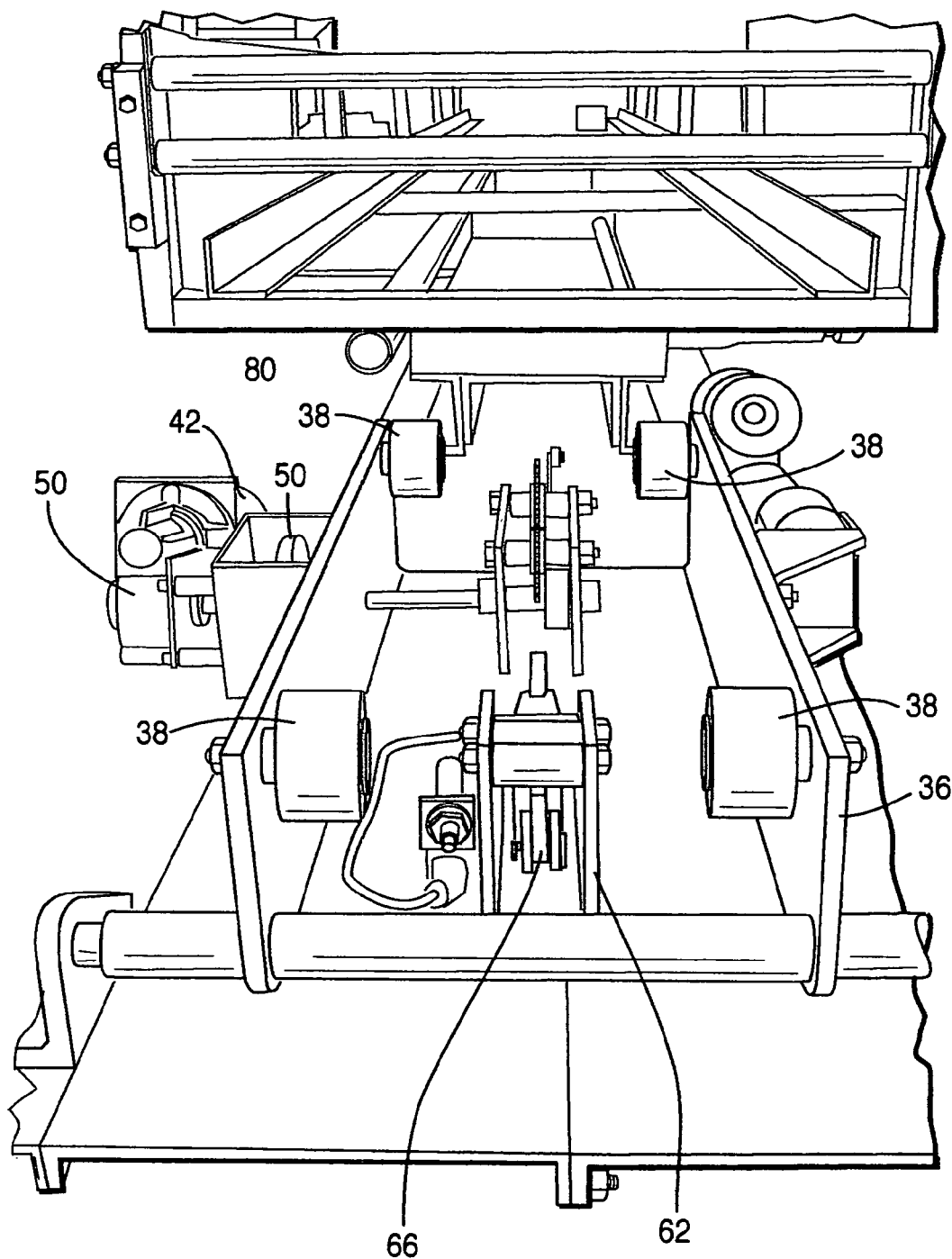
FIG. 3 is an end plan view of an embodiment of the ladder retaining frame and carriage of the present invention shown disengaged in an exploded fashion.
Figure 4:
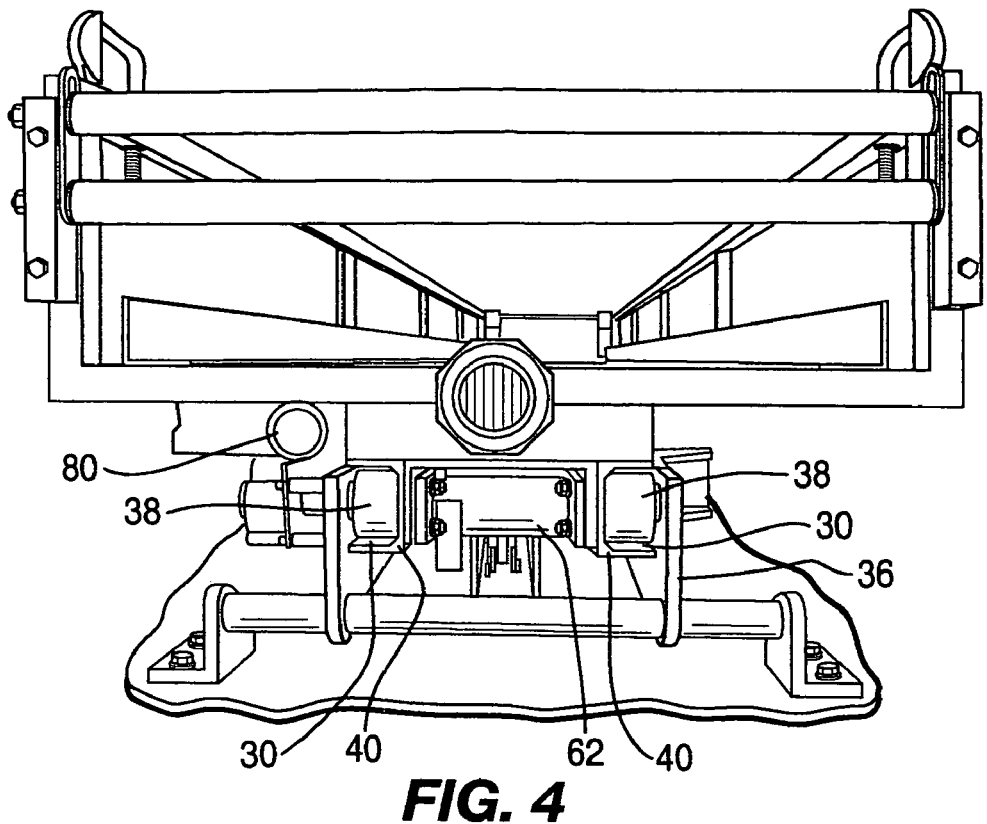
FIG. 4 is an end plan view of an embodiment of the powered ladder storage apparatus of the present invention.
Figure 5:
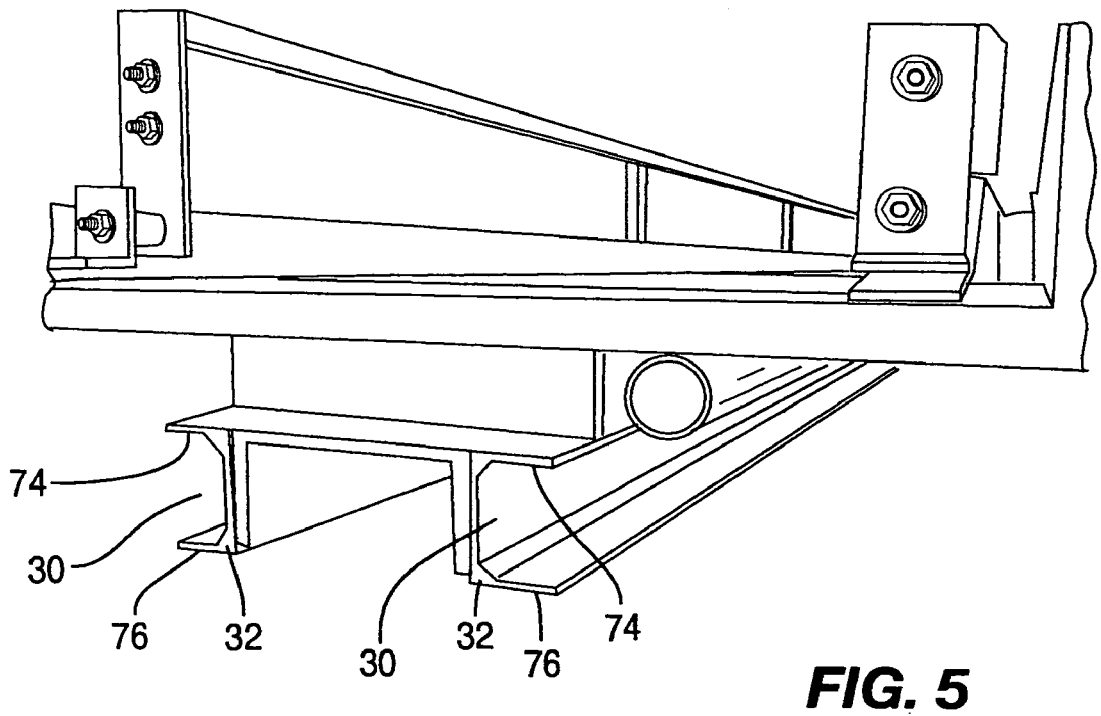
FIG. 5 is a perspective end view of an embodiment of the powered ladder storage apparatus of the present invention.
Figure 6:
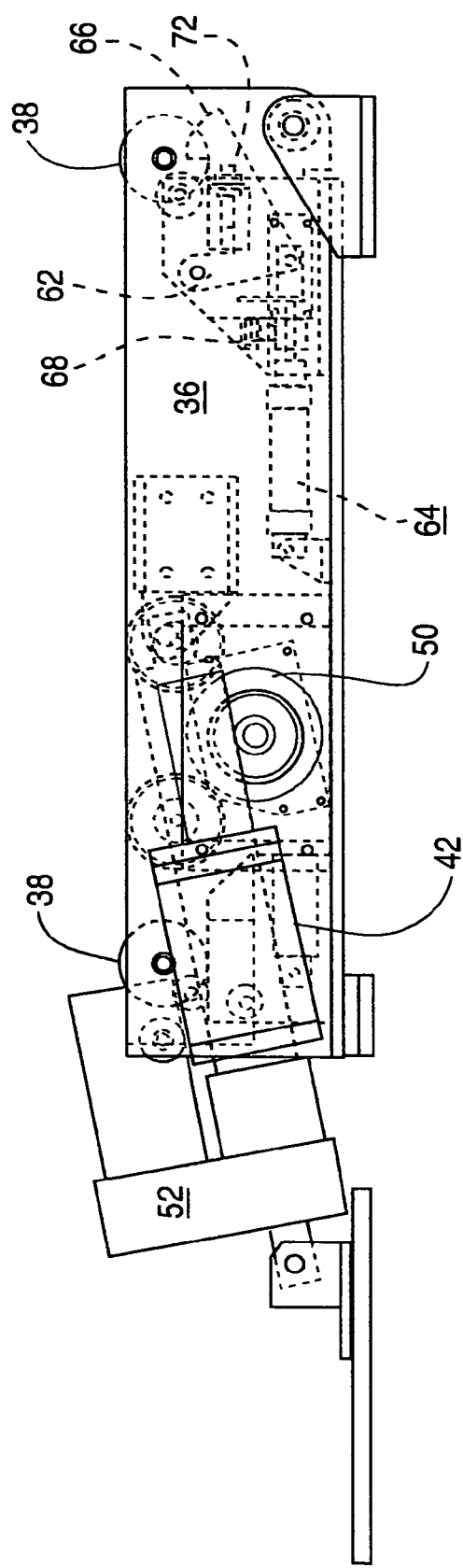
FIG. 6 is a side cross-sectional view of an embodiment of the carriage apparatus of the present invention showing the power drive mechanism and the longitudinally extensible cylinder and the rear locking mechanism.
Figure 7:
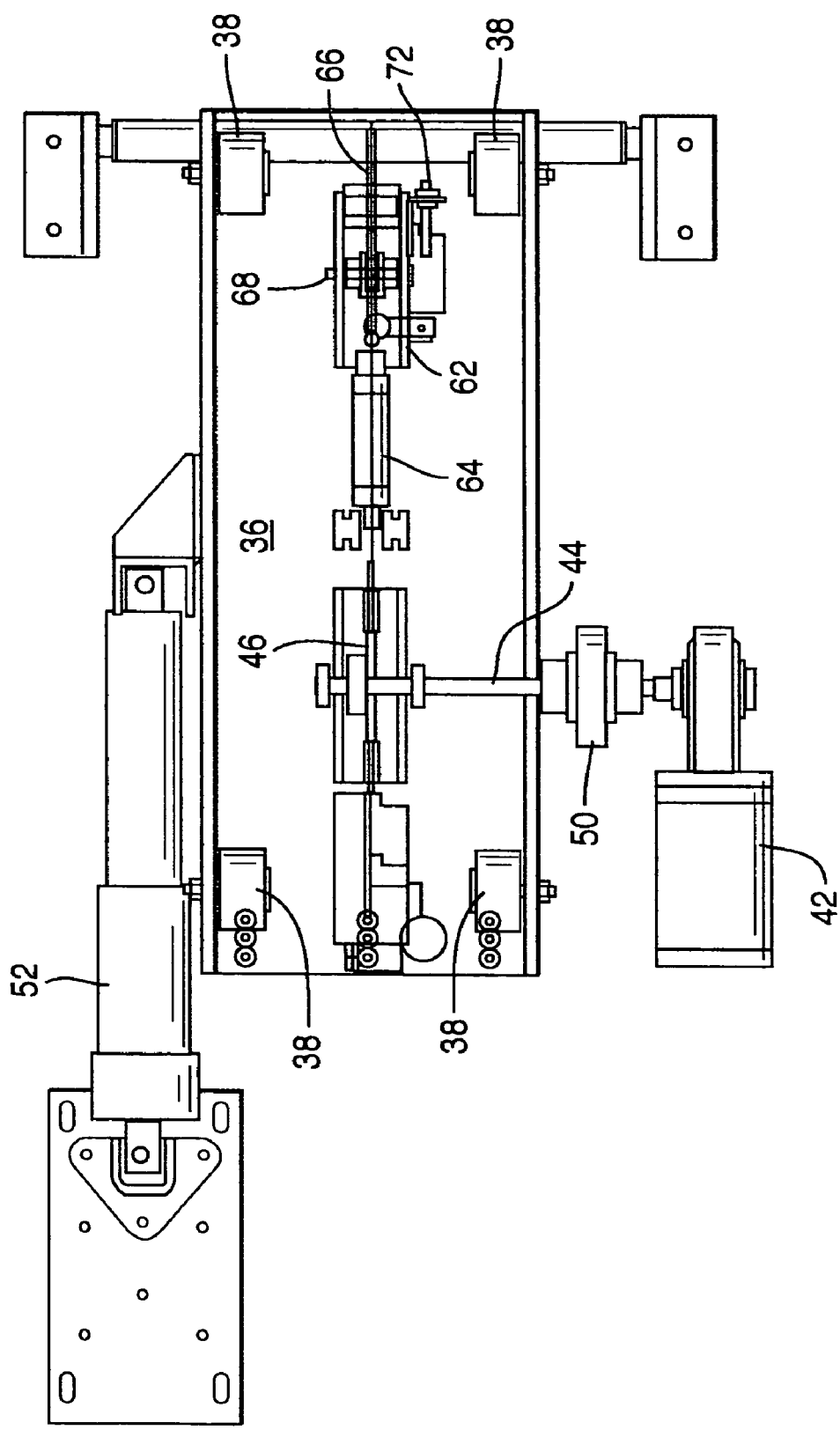
FIG. 7 is a top plan view of the embodiment shown in FIG. 6.

A carriage 36 is included which is pivotally secured with respect to the emergency vehicle 12. The carriage is movably secured with respect to the ladder retaining frame 24 through a plurality of carriage rollers 38. Carriage rollers 38 are rotatably movably mounted to the carriage 36 and are adapted to be positioned within the open channel 30 of the ladder retaining frame 24 for guiding movement thereof. This movement of the ladder retaining frame 24 with respect to the carriage means 36 comprises movement between the storage position 18 and the rearwardly extended position 20. This movement capability is provided since the carriage rollers 38 are adapted to roll within the open channels 30 defined in the ladder retaining frame 24 allowing the movement between the storage position 18 as shown in FIG. 2 and the rearwardly extended position 20 as shown in phantom outline in FIG. 1. To enhance the accuracy of the guided movement between the carriage rollers 38 and the open channel 30 preferably the open channel 30 will include truncated channel corners 32. Similarly the carriage rollers 38 preferably will include truncated roller corners 40. These constructions are best shown in FIGS. 4 and 5. These truncated corners will facilitate guided movability between the carriage rollers 38 and the open channel 30 while maintaining proper orientation during said movement.

The present invention further includes a power drive mechanism 42 for the purpose of urging movement of the ladder retaining frame 24 between the rearwardly extended position 20 and the storage position 18. Usable with the power drive 42 is a power control linkage 44 operatively connected with respect to one or more drive sprockets 46. Drive sprockets 46 are adapted to be powered for movement by the power drive 42 through the power control linkage 44 and are engageable with respect to a drive chain 48. Drive chain 48 is secured longitudinally to the ladder retaining frame 24 fixedly such that rotation of the drive sprocket 46 will cause powered control movement of the ladder retaining frame 24 with respect to the carriage 36 as guided by the positioning of the carriage rollers 38 within the open channels 30.

In order to prevent damage to the apparatus of the present invention and also in order to minimize the possibility of personal damage during movement of the ladder retaining frame 24 between the storage position 18 and the rearwardly extended position 20 a clutch 50 will preferably be included within the power control linkage 44 such that movement of the ladder retaining frame 24 ceases responsive to any such malfunction.

Once the ladder retaining frame 24 moves from the storage position 18 to the rearwardly extended position 20 fully, it will then be desired to move it to the deployed position or rearwardly inclined position 22 to facilitate access to a ladder 12 held thereadjacent. Powering of this movement is provided by a longitudinally extensible means such as a cylinder 52. Cylinder 52 can be pivotally secured at one end thereof with respect to the emergency vehicle or truck body 12 and possibly to a mounting base secured thereto and at the other end can be secured with respect to carriage 36 to cause movement of the ladder retaining frame 24 from the rearwardly extended position 20 to the deployed position or rearwardly inclined position 22 as shown best in FIG. 1. As the longitudinally extensible cylinder 52 extends the front frame end 26 will move upwardly into the air and the rear frame end 28 will move downwardly behind the rear 16 of the emergency vehicle 12 until it moves to an angle of approximately forty-five degrees at which point it will be defined to be positioned within the rearwardly inclined or deployed position 22. At this position access to the ladder 10 is available. Once the ladder is used and it can then again be secured with respect to the ladder retaining frame 24 and move to the rearwardly extended position 20 by contraction of the longitudinally extensible cylinder 52 and thereafter followed by movement to the storage position 18 responsive to opposite movement of the power drive 42.

While in the storage position 18 it is important that the ladder retaining frame 24 and the ladder 10 be firmly secured with respect to the emergency vehicle 12. This firm securement is provided by a plurality of roller supporting members 54 such as support rollers 56 which are mounted to the emergency vehicle 12 and extend upwardly therefrom. The lower portion of the ladder retaining frame 24 is adapted to contact the upper surface of support rollers 56 to be supported thereabove. The ladder retaining frame 24 will be in engagement with respect to the support rollers 56 selectively one at a time as the frame 24 is moved from the rearwardly extended position 20 to the storage position 18.

In order to firmly secure the ladder retaining frame 24 with respect to the emergency vehicle 12 during transportation a front locking means 58 is preferably included. Front locking means 58 preferably takes the form of a plurality of locking wheels 20 mounted to the frontmost bracket which holds the support rollers 56. Locking wheels preferably are positioned above the frontmost support rollers 56 in such a manner that they are engageable with respect to the open channel 30 of the ladder retaining frame 24 as it moves toward the storage position. The locking wheels 60 are designed to rotate with respect to the open channel 30 and be in engagement with respect to an upper support surface 74 defined therein in such a manner as to quite firmly and safely hold the front frame end 26 of the ladder retaining frame 24 with respect to the vehicle 12. Preferably the upper support surface 74 is a downwardly facing surface in the uppermost portion of the open channel 30 designed to abut the locking wheels 60 to permit firm engagement thereof with respect to the open channel 30. It is also preferable that the ladder retaining frame 24 define the lower support surface 76 immediately beneath the open channel area thereof against which the support rollers 56 are designed to contact for facilitating full supporting rolling engagement therewith as the ladder retaining frame 24 moves between the rearwardly extended position 20 and the storage position 18 and while it is stationary within the storage position 18.

Also it is important that the rear portion of the ladder retaining frame 24 be firmly held with respect to the emergency vehicle 12 during transportation thereof. For this purpose a rear locking means 62 is provided. Rear locking means 62 includes a powered air cylinder 64 connected through a rear locking linkage 68 to a mechanical latch 66. Rear locking means 62 and the mechanical latch 66 thereof are movably secured with respect to the carriage 36 and are movable upwardly therefrom to engage the ladder retaining frame 24 near the rear frame end 28 thereof for the purpose of retaining the rear frame end 28 thereof with respect to the emergency vehicle 12 when the frame 24 is positioned in the storage position 18. Similarly the rear locking means 62 can be disengageable from the ladder retaining frame 24 to allow the initiation of movement thereof toward the rearwardly extended position 20.

Figure 8:
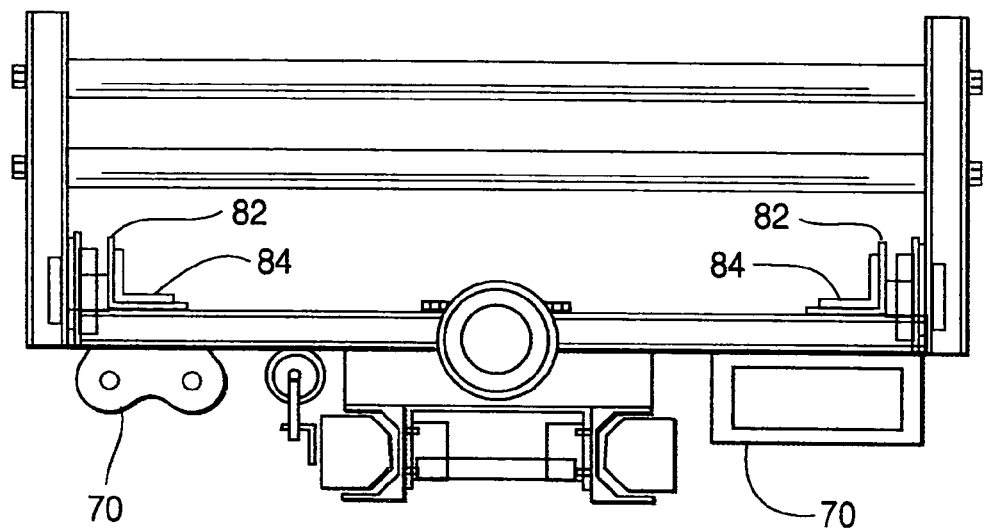
FIG. 8 is an end plan view of an embodiment of the ladder retaining frame showing the equipment holding sleeves and angled bracket members.
Figure 9:
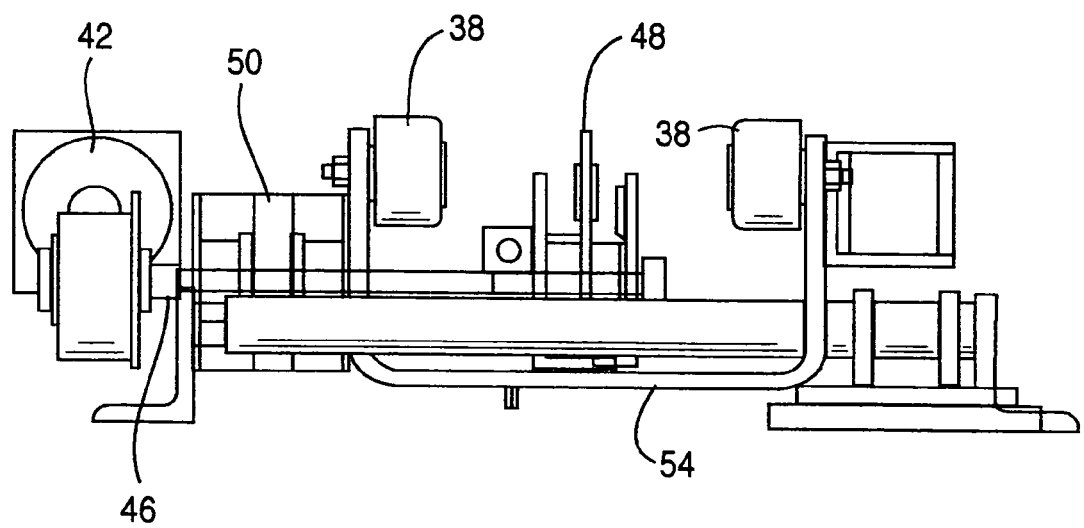
FIG. 9 is an end plan view of an embodiment of one of the support roller constructions of the present invention.
Figure 10:
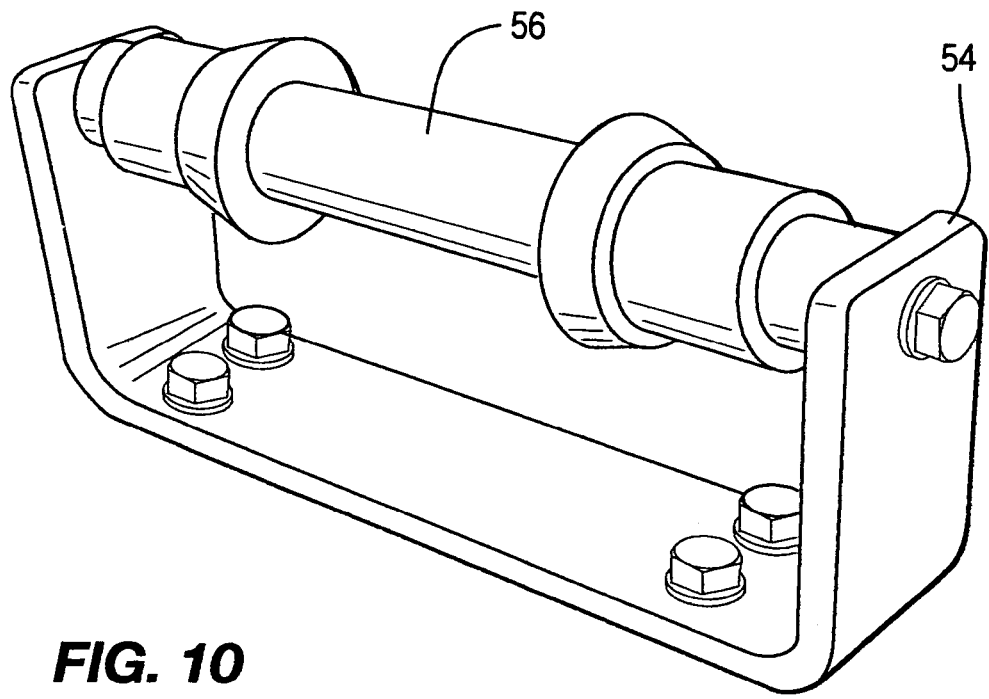
FIG. 10 is a perspective illustration of one of the support roller configurations.
Figure 11:
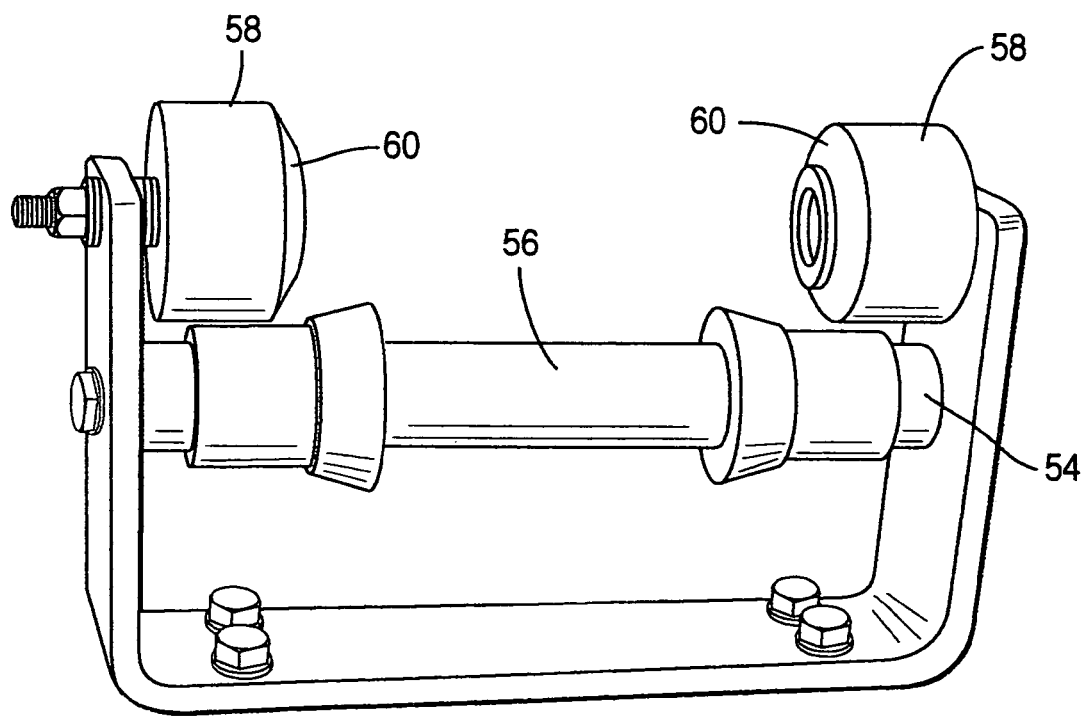
FIG. 11 is a perspective illustration of one of the support roller configurations which include the front locking wheels mounted thereabove.
Figure 12:
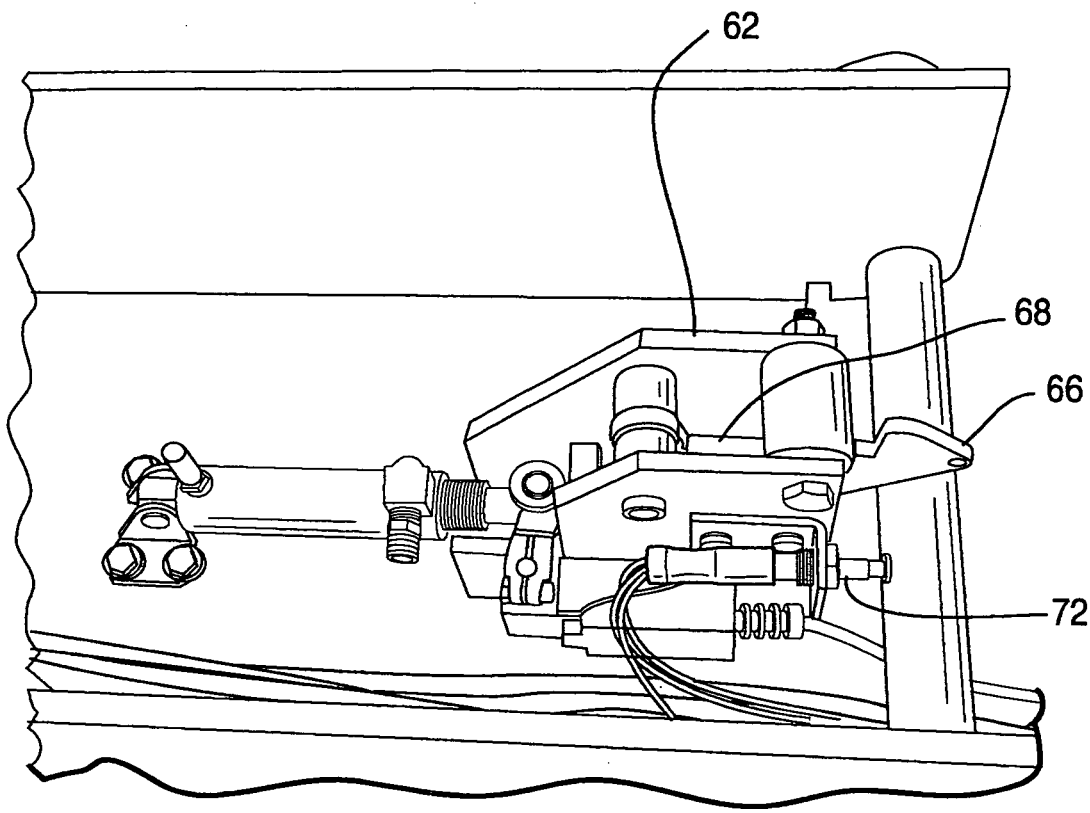
FIG. 12 is a perspective illustration of an embodiment of the rear locking mechanism of the present invention.
Figure 13:
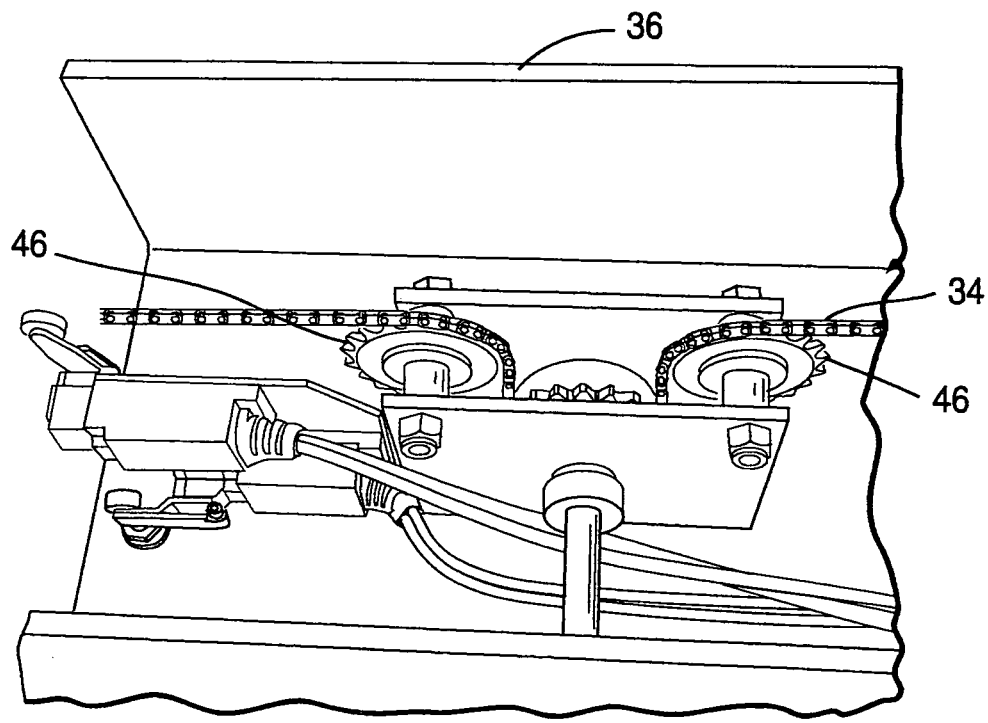
FIG. 13 is a perspective illustration of an embodiment of the power drive linkage of the present invention clearly showing the drive sprockets and drive chain in engagement therewith.
Figure 14:
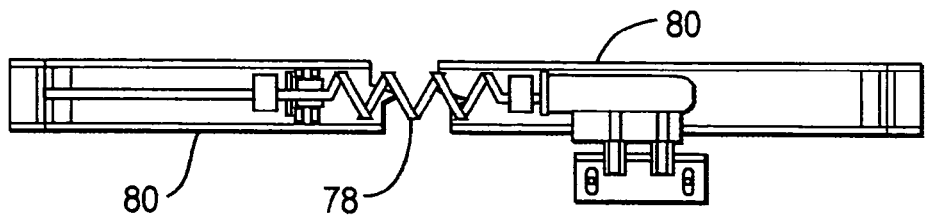
FIG. 14 is an illustration of an embodiment of the electrical conduit of the present invention showing the flexibly resilient electrical line positioned therewithin.
Figure 15:
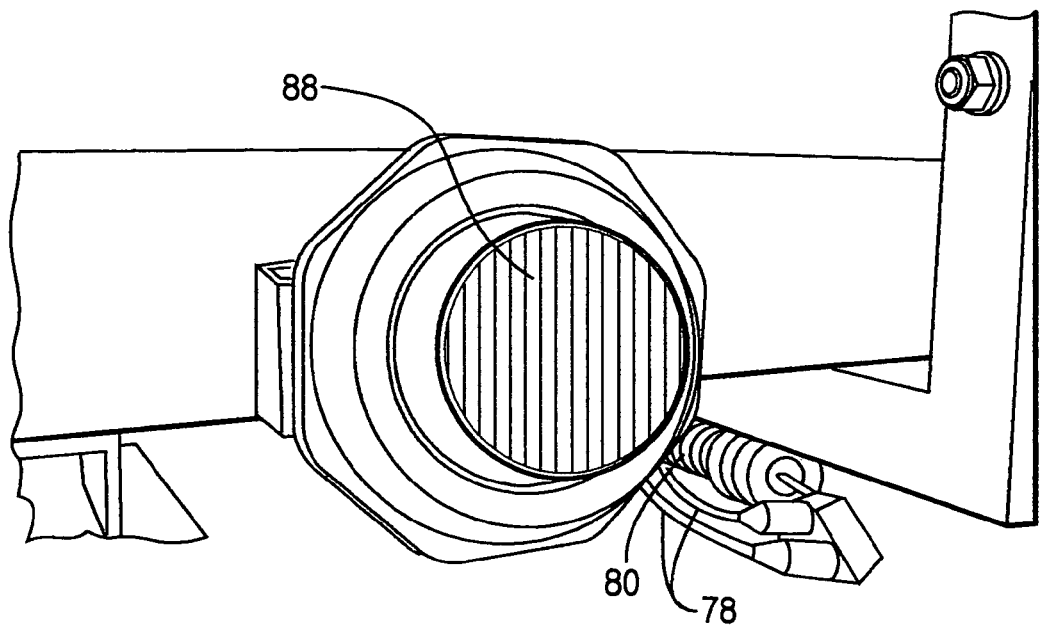
FIG. 15 is a close-up view of the warning light and the electrical conduit and the flexibly resilient electrical line which is designed to give warning if the apparatus of the present invention has not yet reached the fully secured storage position.

Another important aspect of the present invention is the inclusion of the auxiliary equipment holding sleeves 70. These sleeves are best shown in FIG. 8 and are designed to include various types of longitudinally extending emergency equipment or firefighting equipment. Examples of such equipment would include collapsible ladders and firefighting pole-shaped tools. These sleeves provide a mounting means for storing of such rather long and cumbersome pieces of equipment along with a ladder at the remote storage location 18 while allowing them to be readily accessible when the ladder 10 is made readily accessible by movement of the apparatus of the present invention to the deployed position 22.

A rear limit switch 72 monitors the positioning of the ladder retaining frame 24 and is operable to yield a signal which determines when the frame 24 has fully reached the storage position 18.

One or more lights 88 are also included in the present invention which are warning lights which will blink repeatedly whenever the ladder retaining frame 24 is not in the storage position. The light will turn off when the ladder retaining frame 24 reaches the fully stored position and therefore indicate that the emergency vehicle 12 can be moved without danger from the ladder 12 stored thereabove.

Storage of the ladder 10 on the ladder retaining frame 24 is facilitated by the inclusion of angled bracket members 82 as best shown in FIG. 8. Angled bracket members 82 are designed to maintain the ladder 10 spatially disposed from the other portions of the ladder retaining frame 24 to thereby facilitate securement therebetween while minimizing damage to the ladder. Thermoplastic wear blocks 84 are preferably included on each of the angled bracket members 82 along the surfaces which directly contact the ladder 18 to facilitate handling of the ladder while in abutment therewith due to the low coefficient of friction of these surfaces while at the same time minimizing damage to the ladder 10 or the ladder retaining frame 24.

An important characteristic of the present invention is in the relative positioning of the ladder when moved to the deployed or rearwardly inclined position 22. This position is defined to be angled at approximately forty-five degrees with the front frame end 26 in mid air above the top 14 of emergency vehicle 12 and with the rear frame end 28 in mid air behind the rear 16 of the emergency vehicle 12. This forty-five degree angle is an important consideration in view of the fact that this angle is chosen specifically to provide full access to the ladder while minimizing the moment arm of forces exerted upon the ladder retaining frame 24 by extending thereof rearwardly from the emergency vehicle 12. In the preferred configuration the rear frame end 28 will be positioned between 36" and 48" above the ground therebelow in mid air behind the rear 16 of the emergency vehicle 12.

Another important characteristic of the present invention is in the inclusion of an electrical conduit 80. Electrical conduit 80 is tubing designed to receive a flexibly resilient electrical line means 78 extending therethrough. Flexibly resilient electrical line means 78 can be any type of a flexible electrical line such as a coiled or resilient line since electricity must be carried to the light 88 at the rear 16 of emergency vehicle 12 after the full path of movement has occurred between the ladder retaining frame 24 and the carriage 36 or with respect to the emergency vehicle 12. The use of the flexibly resilient electrical line 78 positioned longitudinally with respect to the ladder retaining frame 24 while extending through the electrical conduit 80 is a significant enhancement over all previous designs.

Figure 16:
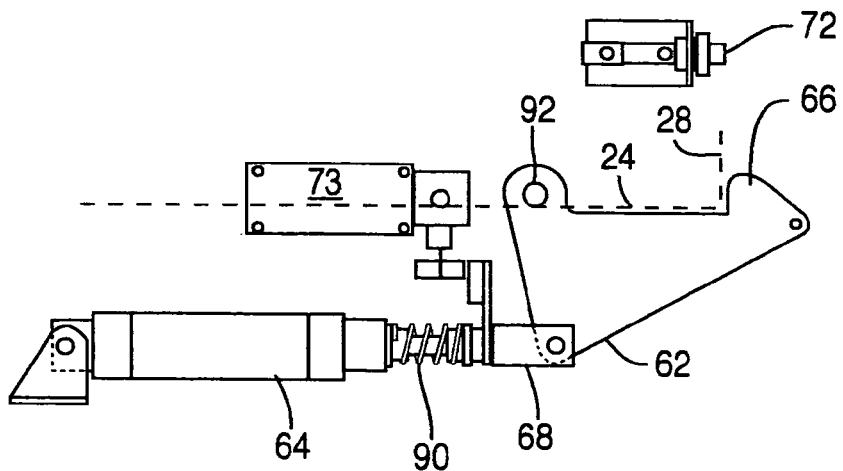
FIG. 16 is a side plan view of an embodiment of the rear locking mechanism showing the powered air cylinder, mechanical latch and rear locking linkage selectively engageable with respect to the ladder retaining frame.

The operation of the mechanical latch, best shown in FIG. 16, is an important advancement of the present invention. The air cylinder 64 is normally maintained in the steady state position extended outwardly to the right. This steady state position allows the mechanical latch 66 to be maintained in the normally locked position in engagement with the rear frame end 28 of the ladder retaining frame 24. This steady state position is achieved by the inclusion of the return spring 90 which causes the mechanical latch 66 to pivot about the pivot position 92 facilitating engagement with rear frame end 28 of the ladder retaining frame 24. A first rear limit switch 72 is included for the purpose of maintaining flashing of the emergency lights whenever the ladder retaining frame 24 is not in the storage position 18. This first limit switch 72 is also operative to terminate operation of the power drive 42 once the ladder retaining frame 28 has fully moved into the storage position 18.

The operation of this mechanical latch is an important consideration of the present invention and the powered air cylinder means is normally maintained in the extended position because of the return spring 90 which causes the output piston of the air cylinder 64 to be extended to the right as shown in FIG. 16. The continuous bias exerted by this return spring 90 will cause the mechanical latch to be maintained under steady state conditions in the locked position rotated counterclockwise as shown in FIG. 16 into engagement with the rear frame end 28 of the ladder retaining frame 24. Retrieval of ladder 10 from the storage position 18 is initiated by activation of the powered air cylinder 64. This activation overcomes the bias of return spring 90 and causes the mechanical latch 66 to rotate clockwise as shown in FIG. 16 and the movement of the rear locking linkage 68 to the left. This movement will cause abutment of this linkage with respect to the second limit switch 73 which will then allow powering of the power drive 42 to facilitate movement of the ladder retaining frame 24 from the storage position 18 toward the rearwardly extended position 20. The powered air cylinder 64 is de-activated when the down switch is released. The powered air cylinder 64 will be de-activated which allows the return spring 90 to again bias the mechanical latch 66 into the locking or extended position. At this point it will not engage the ladder retaining frame 24 since that frame is not located in the storage position 18 anymore. However the mechanical latch 66 will be biased into this engaging position such that when the ladder retaining frame 24 again moves into the storage position 18 the mechanical latch 66 will be brought into engagement with the rear frame end 28 thereof to facilitate holding it in the storage position 18. In operation, as the ladder retaining frame 24 moves to the left as shown in FIG. 16, it will engage the inclined edge of the forwardly extending mechanical latch 66 and will overcome the latch and slightly compress return spring 90 resulting in slight rotational movement of the mechanical latch 66 in the clockwise direction shown in FIG. 16. The latch will quickly snap back to the locking position once the rear frame end 28 of the ladder retaining frame 24 passes the engagement lug of the mechanical latch 66 thereby facilitating retaining of the ladder retaining frame 24 securely latched in the storage position 18.

The first limit switch 72 is operative to maintain the lights 88 in a flashing mode whenever the ladder retaining frame 24 is not firmly secured within the storage position 18. This provides an emergency flashing condition alerting surrounding personnel that the ladder 10 and the ladder retaining frame 24 have not yet been firmly secured into the storage position 18. This first limit switch 72 also is operative to terminate power being supplied to the power drive 42 once the rail is in the stored position.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

We claim:

1. A powered ladder storage apparatus for movement of a ladder between a storage position on top of an emergency vehicle and a deployed position extending downwardly and rearwardly therefrom comprising:
   A. a ladder retaining frame means adapted to receive and selectively retain a ladder thereupon, said ladder retaining frame means being movably attached with respect to an emergency vehicle, said ladder retaining frame means including:
      (1) a front frame end;
      (2) a rear frame end spatially disposed rearwardly from said front frame end;
   B. a carriage means pivotably movably secured with respect to the top of an emergency vehicle, said ladder retaining frame means being movably attached with respect to said carriage means at a location between said front frame end and said rear frame end thereof, said carriage means and said ladder retaining frame means also being pivotally movable together relative to the emergency vehicle;

C. a power drive means operatively attached with respect to said ladder retaining frame means to urge movement thereof in an approximately horizontal direction between a storage position immediately adjacent to the top of the emergency vehicle and a rearwardly extended position extending at least partially rearwardly therefrom in an approximately horizontal orientation;

D. a longitudinally extensible means operatively attached with respect to said carriage means and being operative to cause pivotal movement of said carriage means and said ladder retaining frame means for moving said ladder retaining frame means between the rearwardly extended position and a rearwardly inclined position wherein a ladder retained therewithin is deployed to be readily available for usage with said frame front end positioned in mid air above the top of the emergency vehicle and with the frame rear end position in mid air to the rear of the emergency vehicle, said longitudinally extensible means being operative to cause movement of said ladder retaining frame means toward said rearwardly inclined position responsive to longitudinally extension thereof;

E. at least one roller supporting means secured to the top of the emergency vehicle and extending upwardly therefrom at a position forwardly of said carriage means to facilitate supporting of said ladder retaining frame means above the top of the emergency vehicle when moving toward and away from the storage position and while positioned in the storage position; and F. a front locking means adapted to engage said ladder retaining frame means adjacent said forward frame end thereof responsive to movement thereof into the storage position to facilitate retaining of said forward frame end thereof firmly engaged with respect to the top of the emergency vehicle.

2. A powered ladder storage apparatus for movement of a ladder between a storage position on top of an emergency vehicle and a deployed position extending downwardly and rearwardly therefrom as defined in claim 1 wherein said rear frame end of said ladder retaining frame means is spatially disposed with the surrounding environmental ground surface responsive to being positioned in said rearwardly inclined position.

3. A powered ladder storage apparatus for movement of a ladder between a storage position on top of an emergency vehicle and a deployed position extending downwardly and rearwardly therefrom as defined in claim 2 wherein said rear frame end of said ladder retaining frame means is positioned approximately 36 to 48 inches above the environmental ground surface when positioned in said rearwardly inclined position.

4. A powered ladder storage apparatus for movement of a ladder between a storage position on top of an emergency vehicle and a deployed position extending downwardly and rearwardly therefrom as defined in claim 1 wherein said ladder retaining frame means is movable slidably with respect to said carriage means to facilitate movement therefrom between the storage position and the rearwardly extended position.

5. A powered ladder storage apparatus for movement of a ladder between a storage position on top of an emergency vehicle and a deployed position extending downwardly and rearwardly therefrom as defined in claim 1 wherein said longitudinally extensible means is operative to cause movement of said ladder retaining frame means from said rearwardly inclined position toward the storage position responsive to longitudinal contraction thereof.

6. A powered ladder storage apparatus for movement of a ladder between a storage position on top of an emergency vehicle and a deployed position extending downwardly and rearwardly therefrom as defined in claim 1 wherein said roller supporting means includes a plurality of support rollers spatially disposed with respect to one another for facilitating supporting of said ladder retaining frame means thereabove on the emergency vehicle.

7. A powered ladder storage apparatus for movement of a ladder between a storage position on top of an emergency vehicle and a deployed position extending downwardly and rearwardly therefrom as defined in claim 1 wherein said front locking means comprises a locking wheel means adapted to engage said ladder retaining frame means adjacent said front frame end thereof to further facilitate retaining of said forward frame end thereof firmly engaged with respect to the top of the emergency vehicle responsive to said ladder retaining frame means being in the storage position.

8. A powered ladder storage apparatus for movement of a ladder between a storage position on top of an emergency vehicle and a deployed position extending downwardly and rearwardly therefrom as defined in claim 7 wherein said ladder retaining frame means defines an open channel means extending longitudinally therealong, said open channel means being adapted to receive said locking wheel means therewithin to facilitate detachably securement of said ladder retaining frame means with respect to the emergency vehicle responsive to positioning of said ladder retaining frame means in the storage position.

9. A powered ladder storage apparatus for movement of a ladder between a storage position on top of an emergency vehicle and a deployed position extending downwardly and rearwardly therefrom as defined in claim 8 wherein said locking wheel means are adapted to extend into said open channel means for movable supporting engagement therewith responsive to positioning of said ladder retaining frame means into the storage position to facilitate engagement of said front frame end thereof with respect to the emergency vehicle therebelow.

10. A powered ladder storage apparatus for movement of a ladder between a storage position on top of an emergency vehicle and a deployed position extending downwardly and rearwardly therefrom as defined in claim 8 wherein said ladder retaining frame means defines an upper support surface positioned within said open channel means and facing downwardly therewithin to be positioned in supporting abutment with respect to said locking wheel means to facilitate locking of said front frame end of said ladder retaining frame means in the storage position thereof.

11. A powered ladder storage apparatus for movement of a ladder between a storage position on top of an emergency vehicle and a deployed position extending downwardly and rearwardly therefrom as defined in claim 8 wherein said roller supporting means is adapted to abut said ladder retaining frame means at a position immediately beneath said open channel means defined therein to facilitate supporting of said ladder retaining frame means above the top of the emergency vehicle when moving toward and away from the storage position and while in the storage position.

12. A powered ladder storage apparatus for movement of a ladder between a storage position on top of an emergency vehicle and a deployed position extending downwardly and rearwardly therefrom as defined in claim 8 wherein said ladder retaining frame means defines a lower support surface positioned beneath said open channel means and facing downwardly therefrom to be positioned in supporting abutment with respect to said roller supporting means to facilitate supporting of said ladder retaining frame means thereabove.

13. A powered ladder storage apparatus for movement of a ladder between a storage position on top of an emergency vehicle and a deployed position extending downwardly and rearwardly therefrom as defined in claim 8 wherein said carriage means further includes a plurality of carriage rollers rotatably mounted upon said carriage means, said carriage rollers adapted to be positioned within said open channel means of said ladder retaining frame means to facilitate supported movement thereof relative to said carriage means between the storage position and the rearwardly extended position.

14. A powered ladder storage apparatus for movement of a ladder between a storage position on top of an emergency vehicle and a deployed position extending downwardly and rearwardly therefrom as defined in claim 13 wherein said ladder retaining frame means defines truncated channel corners within said open channel means and wherein said carriage rollers define truncated roller corners thereon, said truncated channel corners and said truncated roller corners being mated to one another and being adjacently positioned to facilitate guiding of relative movement of said ladder retaining frame means with respect to said carriage means between the storage position and the rearwardly extended position.

15. A powered ladder storage apparatus for movement of a ladder between a storage position on top of an emergency vehicle and a deployed position extending downwardly and rearwardly therefrom as defined in claim 1 further comprising a rear locking means adapted to engage said ladder retaining frame means adjacent said rear frame end thereof in order for detachable securement thereof with respect to the emergency vehicle responsive to positioning of said ladder retaining frame means in the storage position.

16. A powered ladder storage apparatus for movement of a ladder between a storage position on top of an emergency vehicle and a deployed position extending downwardly and rearwardly therefrom as defined in claim 15 wherein said rear locking means includes:
  A. a powered air cylinder member secured with respect to said carriage means and extending outwardly therefrom:
  B. a mechanical latch means movably secured with respect to said carriage means; and
  C. rear locking linkage means operatively attached with respect to said powered air cylinder member and operatively attached with respect to said mechanical latch means, said rear locking linkage means and said powered air cylinder member being operative to urge said mechanical latch means selectively into locking engagement with said rear frame end of said ladder retaining frame means for holding of said ladder retaining frame means when in the storage position and being operative responsive to actuation of said powered air cylinder member to disengage said mechanical latch means therefrom to allow movement of said ladder retaining frame means away from the storage position.

17. A powered ladder storage apparatus for movement of a ladder between a storage position on top of an emergency vehicle and a deployed position extending downwardly and rearwardly therefrom as defined in claim 16 further comprising a first rear limit switch adapted to be actuated responsive to movement of said ladder retaining frame means into the storage position for facilitating engagement of said ladder retaining frame means by said mechanical latch means for locking thereof in the storage position and further comprising a second rear limit switch operatively connected to said rear locking linkage means to be actuated responsive to disengagement of the ladder retaining frame means by said mechanical latch means to facilitate actuation of said power drive means for moving of said ladder retaining frame means toward said rearwardly extended position thereof.

18. A powered ladder storage apparatus for movement of a ladder between a storage position on top of an emergency vehicle and a deployed position extending downwardly and rearwardly therefrom as defined in claim 1 further including a power control linkage means operatively secured to said power drive means and operatively secured to said ladder retaining frame means to control movement thereof between the storage position and the rearwardly extended position responsive to operation of said power drive means.

19. A powered ladder storage apparatus for movement of a ladder between a storage position on top of an emergency vehicle and a deployed position extending downwardly and rearwardly therefrom as defined in claim 18 wherein said power control linkage means includes a drive sprocket rotatable mounted with respect to carriage means and positioned in engagement with respect to said ladder retaining frame means to facilitate driving thereof between the storage position and the rearwardly extending position thereof.

20. A powered ladder storage apparatus for movement of a ladder between a storage position on top of an emergency vehicle and a deployed position extending downwardly and rearwardly therefrom as defined in claim 19 wherein said power control linkage means further includes a clutch means operative to cause cessation in driving movement of said ladder retaining frame means between the storage position and the rearwardly extended position thereof responsive to a malfunction.

21. A powered ladder storage apparatus for movement of a ladder between a storage position on top of an emergency vehicle and a deployed position extending downwardly and rearwardly therefrom as defined in claim 20 wherein said ladder retaining frame means includes a drive chain means mounted extending longitudinally therealong and wherein said drive sprocket is positioned in engagement with said drive chain means to facilitate driving of movement of said ladder retaining frame means between the storage position and the rearwardly extended position.

22. A powered ladder storage apparatus for movement of a ladder between a storage position on top of an emergency vehicle and a deployed position extending downwardly and rearwardly therefrom as defined in claim 1 further including a flexibly resilient electrical line means fixedly secured to said carriage means and fixed secured to said ladder retaining frame means, said flexibly resilient electrical means being movable with said ladder retaining frame means between the storage position and the rearwardly extended position and said rearwardly inclined position while maintaining attachment to said carriage means due to the flexible resilience thereof.

23. A powered ladder storage apparatus for movement of a ladder between a storage position on top of an emergency vehicle and a deployed position extending downwardly and rearwardly therefrom as defined in claim 22 further comprising an electrical conduit means fixedly secured to said ladder retaining frame means and extending longitudinally therealong, said flexibly resilient electrical line means being positionable within said electrical conduit means to facilitate movement thereof along with said ladder retaining frame means while maintaining securement of said flexibly resilient electrical line means with respect to said carriage means.

24. A powered ladder storage apparatus for movement of a ladder between a storage position on top of an emergency vehicle and a deployed position extending downwardly and rearwardly therefrom as defined in claim 1 wherein said ladder retaining frame means further comprises a plurality of angled bracket members fixedly secured thereto which are adapted to receive a ladder in abutment therewith when attached to said ladder retaining frame means to facilitate retaining thereof.

25. A powered ladder storage apparatus for movement of a ladder between a storage position on top of an emergency vehicle and a deployed position extending downwardly and rearwardly therefrom as defined in claim 24 wherein each of said angled bracket members include thermoplastic wear blocks to further facilitate holding of a ladder by said ladder retaining frame means.

26. A powered ladder storage apparatus for movement of a ladder between a storage position on top of an emergency vehicle and a deployed position extending downwardly and rearwardly therefrom as defined in claim 1 further comprising at least one equipment holding sleeve means secured to said ladder retaining frame means and extending longitudinally therealong for receiving and holding auxiliary fire fighting equipment.

27. A powered ladder storage apparatus for movement of a ladder between a storage position on top of an emergency vehicle and a deployed position extending downwardly and rearwardly therefrom as defined in claim 1 wherein said ladder retaining frame means is orientated at an angle of forty-five degrees with respect to the emergency vehicle when positioned in the rearwardly inclined position.

28. A powered ladder storage apparatus for movement of a ladder between a storage position on top of an emergency vehicle and a deployed position extending downwardly and rearwardly therefrom comprising:
  A. a ladder retaining frame means adapted to receive and selectively retain a ladder thereupon, said ladder retaining frame means being movably attached with respect to an emergency vehicle, said ladder retaining frame means including:
    (1) a front frame end;
    (2) a rear frame end spatially disposed rearwardly from said front frame end;
    (3) an open channel means extending longitudinally therealong;
  B. a carriage means pivotably movably secured with respect to the top of an emergency vehicle, said ladder retaining frame means being movably attached with respect to said carriage means at a location between said front frame end and said rear frame end thereof, said carriage means and said ladder retaining frame means also being pivotally movable together relative to the emergency vehicle, said carriage means further including a plurality of carriage rollers rotatably mounted upon said carriage means, said carriage rollers adapted to be positioned within said open channel means of said ladder retaining frame means to facilitate supported movement thereof relative to said carriage means between a storage position and a rearwardly extended position;
  C. a power drive means operatively attached with respect to said ladder retaining frame means to urge sliding movement thereof in an approximately horizontal direction between the storage position immediately adjacent to the top of the emergency vehicle and the rearwardly extended position extending at least partially rearwardly therefrom in an approximately horizontal orientation;
  D. a longitudinally extensible means operatively attached with respect to said carriage means and being operative to cause pivotal movement of said carriage means and said ladder retaining frame means for moving said ladder retaining frame means between the rearwardly extended position and a rearwardly inclined position wherein a ladder retained therewithin is deployed to be readily available for usage with said frame front end positioned in mid air above the top of the emergency vehicle and with the frame rear end position in mid air to the rear of the emergency vehicle, said rear frame end of said ladder retaining frame means being spatially disposed with the surrounding environmental ground surface responsive to being positioned in said rearwardly inclined position, said rear frame end of said ladder retaining frame means being positioned approximately 36 to 48 inches above the environmental ground surface when positioned in said rearwardly inclined position, said longitudinally extensible means being operative to cause movement of said ladder retaining frame means toward said rearwardly inclined position responsive to longitudinally extension thereof, said longitudinally extensible means being operative to cause movement of said ladder retaining frame means from said rearwardly inclined position toward the storage position responsive to longitudinal contraction thereof;
  E. at least one roller supporting means secured to the top of the emergency vehicle and extending upwardly therefrom at a position forwardly of said carriage means to facilitate supporting of said ladder retaining frame means above the top of the emergency vehicle when moving toward and away from the storage position and while positioned in the storage position, said roller supporting means including a plurality of support rollers spatially disposed with respect to one another for facilitating supporting of said ladder retaining frame means thereabove on the emergency vehicle;
  F. a front locking means adapted to engage said ladder retaining frame means adjacent said forward frame end thereof responsive to movement thereof into the storage position to facilitate retaining of said forward frame end thereof firmly engaged with respect to the top of the emergency vehicle, said front locking means including a locking wheel means adapted to engage said ladder retaining frame means adjacent said front frame end thereof to further facilitate retaining of said forward frame end thereof firmly engaged with respect to the top of the emergency vehicle responsive to said ladder retaining frame means being in the storage position, said locking wheel means adapted to be positionable within said open channel means to facilitate detachably securement of said ladder retaining frame means with respect to the emergency vehicle responsive to positioning of said ladder retaining frame means in the storage position;
  G. a rear locking means adapted to engage said ladder retaining frame means adjacent said rear frame end thereof in order for detachable securement thereof with respect to the emergency vehicle responsive to positioning of said ladder retaining frame means in the storage position; and H. at least one equipment holding sleeve means secured to said ladder retaining frame means and extending longitudinally therealong for receiving and holding auxiliary fire fighting equipment therewithin.

29. A powered ladder storage apparatus for movement of a ladder between a storage position on top of an emergency vehicle and a deployed position extending downwardly and rearwardly therefrom comprising:

A. a ladder retaining frame means adapted to receive and selectively retain a ladder thereupon, said ladder retaining frame means being movably attached with respect to an emergency vehicle, said ladder retaining frame means including:
   (1) a front frame end;
   (2) a rear frame end spatially disposed rearwardly from said front frame end;
   (3) an open channel means extending longitudinally therealong; and
   (4) truncated channel corners located within said open channel means;
   (5) a drive chain means fixedly mounted extending longitudinally therealong;

B. a carriage means pivotably movably secured with respect to the top of an emergency vehicle, said ladder retaining frame means being movably attached with respect to said carriage means at a location between said front frame end and said rear frame end thereof, said carriage means and said ladder retaining frame means also being pivotally movable together relative to the emergency vehicle, said carriage means further including a plurality of carriage rollers rotatably mounted upon said carriage means, said carriage rollers adapted to be positioned within said open channel means of said ladder retaining frame means to facilitate supported movement thereof relative to said carriage means between a storage position and a rearwardly extended position, said carriage rollers defining truncated roller corners thereon, said truncated channel corners and said truncated roller corners being mated to one another and being adjacently positioned to facilitate guiding horizontal relative movement of said ladder retaining frame means with respect to said carriage means;

C. a power drive means operatively attached with respect to said ladder retaining frame means to urge sliding movement thereof in an approximately horizontal direction between the storage position immediately adjacent to the top of the emergency vehicle and the rearwardly extended position extending at least partially rearwardly therefrom in an approximately horizontal orientation;

D. a power control linkage means operatively secured to said power drive means and operatively secured to said ladder retaining frame means to control movement thereof between the storage position and the rearwardly extended position responsive to operation of said power drive means, said power control linkage means including;
   (1) a drive sprocket rotatable mounted with respect to carriage means and positioned in engagement with respect to said ladder retaining frame means to facilitate driving thereof between the storage position and the rearwardly extending position thereof, said drive sprocket being positioned in engagement with said drive chain means to facilitate driving of movement of said ladder retaining frame means between the storage position and the rearwardly extended position;
   (2) a clutch means operative to cause cessation in driving movement of said ladder retaining frame means between the storage position and the rearwardly extended position thereof responsive to a malfunction;

E. a longitudinally extensible means operatively attached with respect to said carriage means and being operative to cause pivotal movement of said carriage means and said ladder retaining frame means for moving said ladder retaining frame means between the rearwardly extended position and a rearwardly inclined position wherein a ladder retained therewithin is deployed to be readily available for usage with said frame front end positioned in mid air above the top of the emergency vehicle and with the frame rear end positioned in mid air to the rear of the emergency vehicle, said rear frame end of said ladder retaining frame means being spatially disposed with the surrounding environmental ground surface responsive to being positioned in said rearwardly inclined position, said rear frame end of said ladder retaining frame means being positioned approximately 36 to 48 inches above the environmental ground surface when positioned in said rearwardly inclined position, said longitudinally extensible means being operative to cause movement of said ladder retaining frame means toward said rearwardly inclined position responsive to longitudinally extension thereof, said longitudinally extensible means being operative to cause movement of said ladder retaining frame means from said rearwardly inclined position toward the storage position responsive to longitudinal contraction thereof;

F. at least one roller supporting means secured to the top of the emergency vehicle and extending upwardly therefrom at a position forwardly of said carriage means to facilitate supporting of said ladder retaining frame means above the top of the emergency vehicle when moving toward and away from the storage position and while positioned in the storage position, said roller supporting means including a plurality of support rollers spatially disposed with respect to one another for facilitating supporting of said ladder retaining frame means thereabove on the emergency vehicle, said roller supporting means being adapted to abut said ladder retaining frame means at a position immediately beneath said open channel means defined therein to facilitate supporting of said ladder retaining frame means above the top of the emergency vehicle when moving toward and away from the storage position and while in the storage position;

G. a front locking means adapted to engage said ladder retaining frame means adjacent said forward frame end thereof responsive to movement thereof into the storage position to facilitate retaining of said forward frame end thereof firmly engaged with respect to the top of the emergency vehicle, said front locking means including a locking wheel means adapted to engage said ladder retaining frame means adjacent said front frame end thereof to further facilitate retaining of said forward frame end thereof firmly engaged with respect to the top of the emergency vehicle responsive to said ladder retaining frame means being in the storage position, said locking wheel means adapted to be positionable within said open channel means to facilitate detachably securement of said ladder retaining frame means with respect to the emergency vehicle responsive to positioning of said ladder retaining frame means in the storage position;

H. a rear locking means adapted to engage said ladder retaining frame means adjacent said rear frame end thereof in order for detachable securement thereof with respect to the emergency vehicle responsive to positioning of said ladder retaining frame means in the storage position, said rear locking means including:
  (1) a powered air cylinder member secured with respect to said carriage means and extending outwardly therefrom:
  (2) a mechanical latch means movably secured with respect to said carriage means; and
  (3) rear locking linkage means operatively attached with respect to said powered air cylinder member and operatively attached with respect to said mechanical latch means, said rear locking linkage means and said powered air cylinder member being operative to urge said mechanical latch means selectively into locking engagement with said rear frame end of said ladder retaining frame means for holding of said ladder retaining frame means when in the storage position and being operative responsive to actuation of said powered air cylinder member to disengage said mechanical latch means therefrom to allow movement of said ladder retaining frame means away from the storage position;

I. at least one equipment holding sleeve means secured to said ladder retaining frame means and extending longitudinally therealong for receiving and holding auxiliary fire fighting equipment therewithin;

J. a first rear limit switch adapted to be actuated responsive to movement of said ladder retaining frame means into the storage position for facilitating engagement of said ladder retaining frame means by said mechanical latch means for locking thereof in the storage position; and K. a second rear limit switch operatively connected to said rear locking linkage means to be actuated responsive to disengagement of the ladder retaining frame means by said mechanical latch means to facilitate actuation of said power drive means for moving of said ladder retaining frame means toward said rearwardly extended position thereof.

* * * * *